(12) United States Patent  
Siddappa

(10) Patent No.: US 7,284,081 B2  
(45) Date of Patent: Oct. 16, 2007

(54) METHOD AND SYSTEM FOR ROUTING DATA BETWEEN USB PORTS

(75) Inventor: Mahesh Siddappa, Santa Clara, CA (US)

(73) Assignee: Atmel Corporation, San Jose, CA (US)

( * ) Notice: Subject to any disclaimer, the term of this patent is extended or adjusted under 35 U.S.C. 154(b) by 319 days.

(21) Appl. No.: 10/766,276

(22) Filed: Jan. 27, 2004

(65) Prior Publication Data

US 2005/0180388 A1    Aug. 18, 2005

(51) Int. Cl.  
*G06F 13/96* (2006.01)

(52) U.S. Cl. ............... 710/312; 710/313; 710/314; 710/301; 710/29

(58) Field of Classification Search ........ 710/300–317, 710/56–61, 29, 31–38, 8–19, 62–64, 72; 709/238–242  
See application file for complete search history.

(56) References Cited

U.S. PATENT DOCUMENTS

| | | |
|---|---|---|
| 5,790,541 A | 8/1998 | Patrick et al. |
| 5,802,278 A | 9/1998 | Isfeld et al. |
| 5,903,777 A | 5/1999 | Brief |
| 5,938,770 A | 8/1999 | Kim |
| 6,092,210 A * | 7/2000 | Larky et al. ............... 713/400 |
| 6,199,137 B1 * | 3/2001 | Aguilar et al. ............. 710/305 |
| 6,334,160 B1 | 12/2001 | Emmert et al. |
| 6,415,337 B1 | 7/2002 | Chung |
| 6,529,963 B1 * | 3/2003 | Fredin et al. ................ 710/1 |
| 6,546,450 B1 | 4/2003 | Liu |
| 6,549,966 B1 * | 4/2003 | Dickens et al. ........... 710/300 |
| 6,567,921 B1 | 5/2003 | Guziak |
| 6,732,219 B1 * | 5/2004 | Broyles .................... 710/316 |
| 6,839,771 B1 * | 1/2005 | Bouchier et al. ......... 709/253 |
| 6,862,647 B1 * | 3/2005 | Hewitt ...................... 710/313 |
| 6,874,044 B1 * | 3/2005 | Chou et al. ................. 710/62 |
| 6,874,055 B2 * | 3/2005 | Chiang et al. ............. 710/316 |
| 7,028,133 B1 * | 4/2006 | Jackson .................... 710/313 |
| 2004/0030820 A1 * | 2/2004 | Lan .......................... 710/300 |
| 2004/0148450 A1 * | 7/2004 | Chen et al. ................ 710/313 |

* cited by examiner

*Primary Examiner*—Raymond N Phan  
(74) *Attorney, Agent, or Firm*—Sawyer Law Group LLP

(57) ABSTRACT

Aspects for high speed USB data routing are presented. The aspects include routing a data stream to and from USB I/O ports serially, and maintaining a frequency of the data stream during the routing. Additionally, a root port router is provided for the root port and a data port router is provided for each I/O port, wherein each data port router delays the data stream by one bit during the routing.

13 Claims, 4 Drawing Sheets

METHOD AND SYSTEM FOR ROUTING DATA BETWEEN USB PORTS

FIELD OF THE INVENTION

The present invention relates to routing of USB data streams, and more particularly to serial data routing of high speed USB data streams.

BACKGROUND OF THE INVENTION

The Universal Serial Bus (USB) is a peripheral bus specification developed by PC and telecom industry leaders. USB Specification version 1.1 supports two different rates for transmitting data: 1.5 Mega bits (Mbits) per second for low-speed devices and 12 Mbits/second for full speed devices. Recently a USB Specification Version 2.0 was made available. USB Specification 2.0 extends the rate for transferring data from 12 Mbps (referred to herein as 12 MHz) on USB 1.1 up to 480 Mbps (referred to herein as 480 MHz) on USB 2.0 for high speed devices.

Under the specification, the USB allows the plug-and-play capability of computer peripherals outside the PC case. The capability eliminates the need to install interface cards into dedicated computer slots and reconfigure the system each time a peripheral is attached or detached from a PC. Typically, a USB system may be expanded by providing a USB hub which provides USB port replication. A USB hub may be connected to another USB hub and service multiple USB ports. Up to 127 devices may be connected to a data processing system through a USB interface.

As shown in an example in FIG. 1, a host 12, i.e. a computer system, includes ports 1, 2 that provide USB connection points to devices 14 and a USB hub 16. Under the protocol of USB standard, devices 14 are classified into mainly three types. The first one is the type of a human-interface device (HID), i.e. keyboard, mouse, or, alternately, an interrupt device. The second one is the type of a bulk device, i.e. a scanner, which places strict requirement on accuracy of each data bits transmitted. The third one is the type of an isochronous device, i.e. an audio device, which does not place strict requirement on accuracy of each data bits transmitted. As indicated, the hub 16 is a device which provides additional attachment points for the host 12 to devices 14.

Hub 16 is therefore a key element in the plug-and-play architecture of computer system 12, and is a wiring concentrator which enables the multiple attachment characteristics of USB. The upstream port of hub 16 connects the hub 16 towards the host 12. Each of the downstream ports of hub 16 allows connection to another hub or device 14. Hub 16 detects the attachment and detachment of a USB device 14 at each downstream port and enables the distribution of power to these downstream USB devices 14.

In routing the data within the hub 16, complexity is increased at the high speed operation of 480 MHz under USB 2.0. While attempts to reduce the frequency during the routing have been made, such attempts have their own complexities due to synchronization, timing, and clocking issues during conversion of the frequency to a lower frequency for routing from the source port and then back to a higher frequency at the destination port. Accordingly, a need exists for a routing scheme for USB connections that supports high speed operation efficiently and effectively. The present invention addresses such a need.

SUMMARY OF THE INVENTION

Aspects for high speed USB data routing are presented. The aspects include routing a data stream to and from USB I/O ports serially, and maintaining a frequency of the data stream during the routing. Additionally, a root port router is provided for the root port and a data port router is provided for each I/O port, wherein each data port router delays the data stream by one bit during the routing.

Through the present invention, an effective and straightforward routing solution for USB data transfers at high speed is achieved. The present invention utilizes a serial data routing scheme that is less complex when compared to parallel routing solutions which rely on data conversions to lower speeds during routing. These and other advantages of the present invention will be more fully understood in conjunction with the following detailed description and accompanying drawings.

DETAILED DESCRIPTION

The present invention relates to data routing of high speed USB data. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
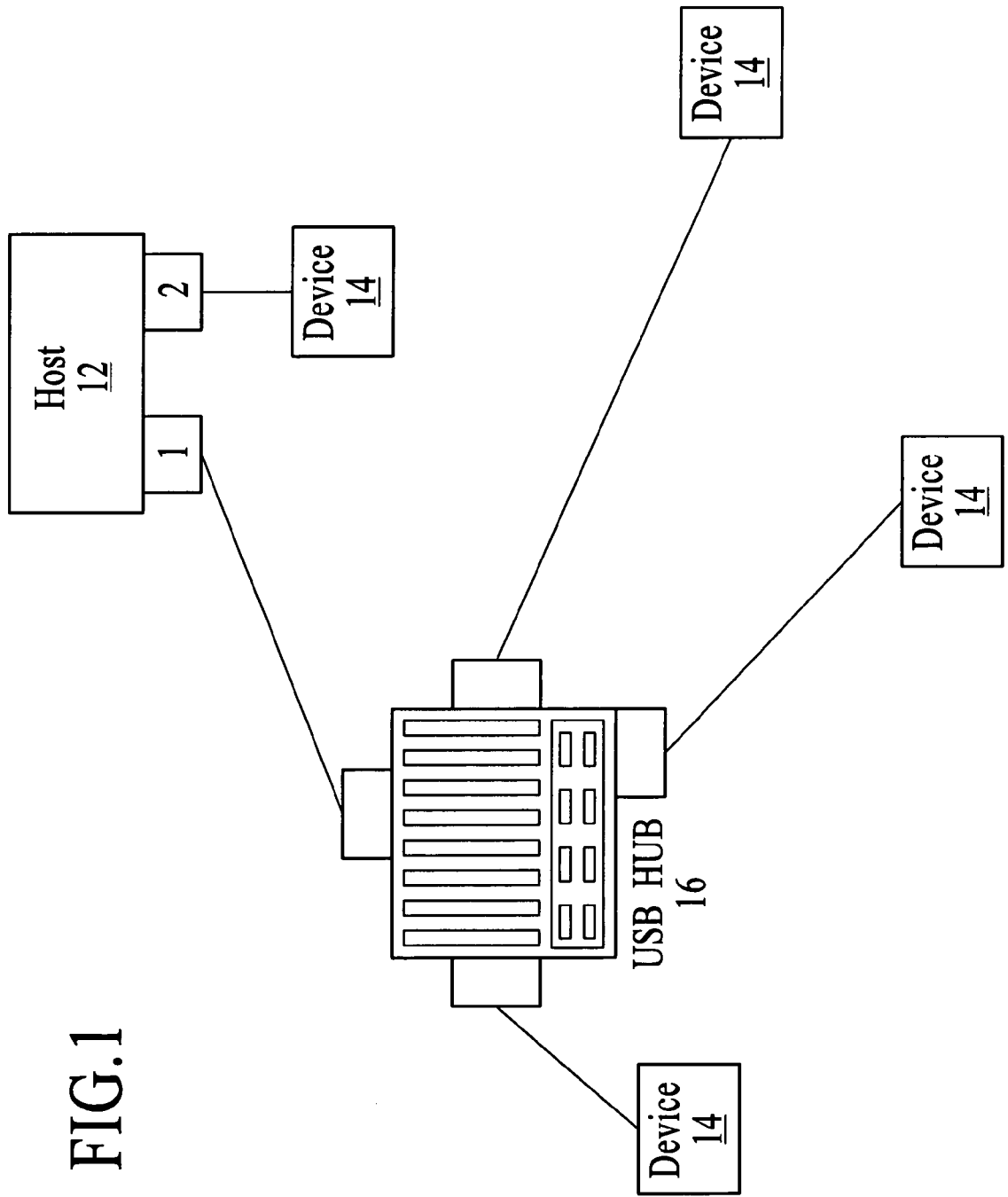
FIG. 1 illustrates a block diagram representation of a typical computer system with USB connections.
Figure 2:
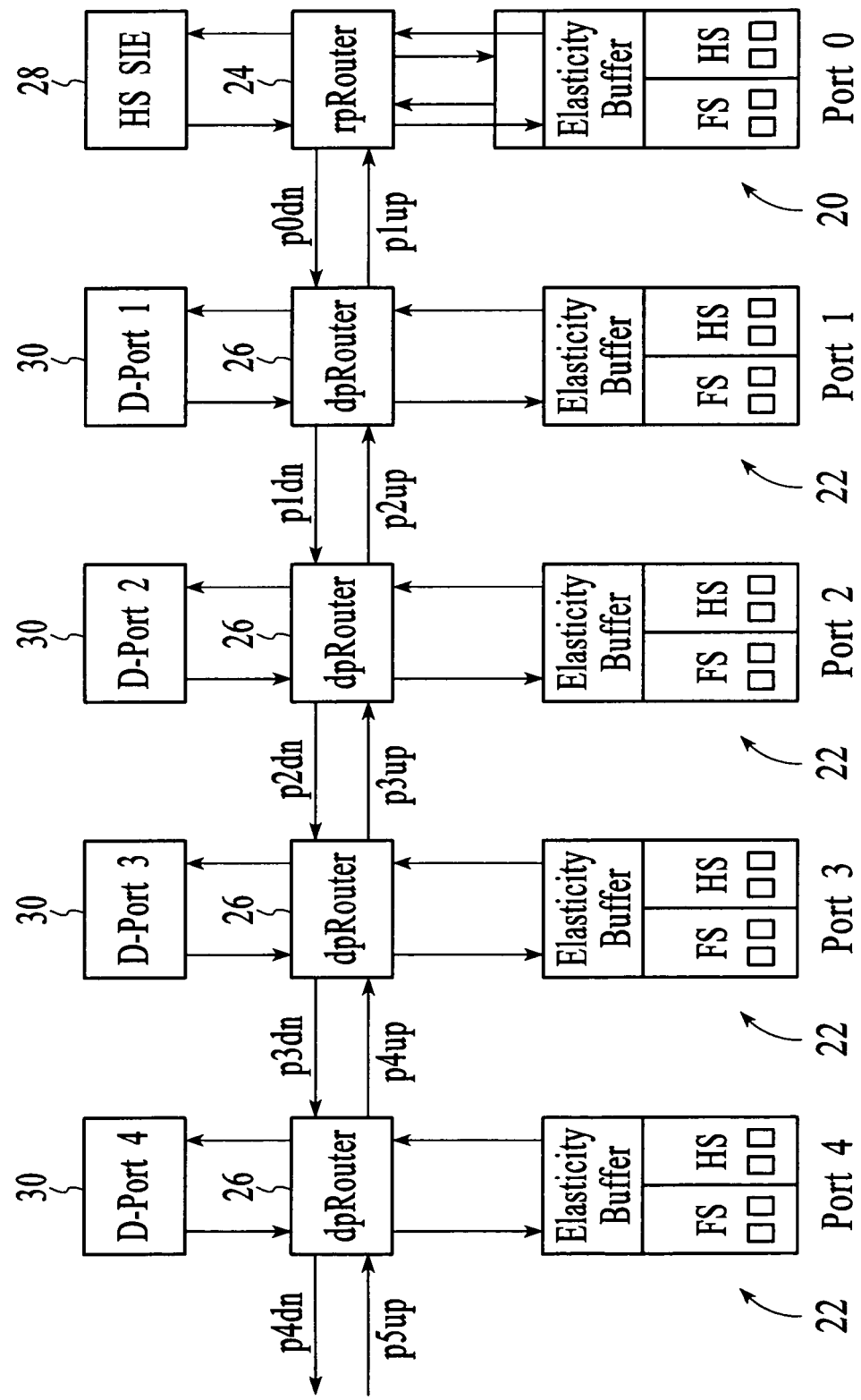
FIG. 2 illustrates a router portion of a USB hub in accordance with a preferred embodiment of the present invention.

The present invention provides data routing of data streams between USB connections utilizing a serial routing scheme. FIG. 2 illustrates an overall block diagram of a router portion of a USB hub implementing the serial routing scheme of the present invention. It should be appreciated that although the description of the aspects of the present invention is presented with reference to implementation in a USB hub, this is meant as illustrative and not restrictive of an environment within which the present invention finds particular benefit.

Referring to FIG. 2, a router portion of a USB hub is shown as an example of a preferred embodiment of the present invention and includes a root port 20 (Port0) and four I/O (input/output) ports 22 (Port1, Port2, Port3, and Port4), each of which includes data buffers. Although only four I/O ports are illustrated, the present invention may be implemented with a different number of I/O ports, as needed. However, the serial routing scheme of the present invention introduces a delay of one clock between the I/O ports, so that, under the USB specification at the time of the invention, the total number of I/O ports is limited to no more than seven.

Referring again to FIG. 2, coupled to the root port 20 is a root port router 24. Coupled to each I/O port 22 is a data port router 26. The data port routers 26 are coupled in series one to another with the data port router 26 of Port1 coupled in series with the root port router 24. The root port router 24 is further coupled to a high speed serial interface engine 28 (HS SIE), which performs preprocessing including enumeration of the circuit and the resetting and enabling of each I/O port 22, as is well appreciated by those skilled in the art. Coupled to each data port router 26 is a data port control block 30 which provides signals for I/O port enabling, as illustrated more particularly with reference to FIG. 3.

Figure 3:
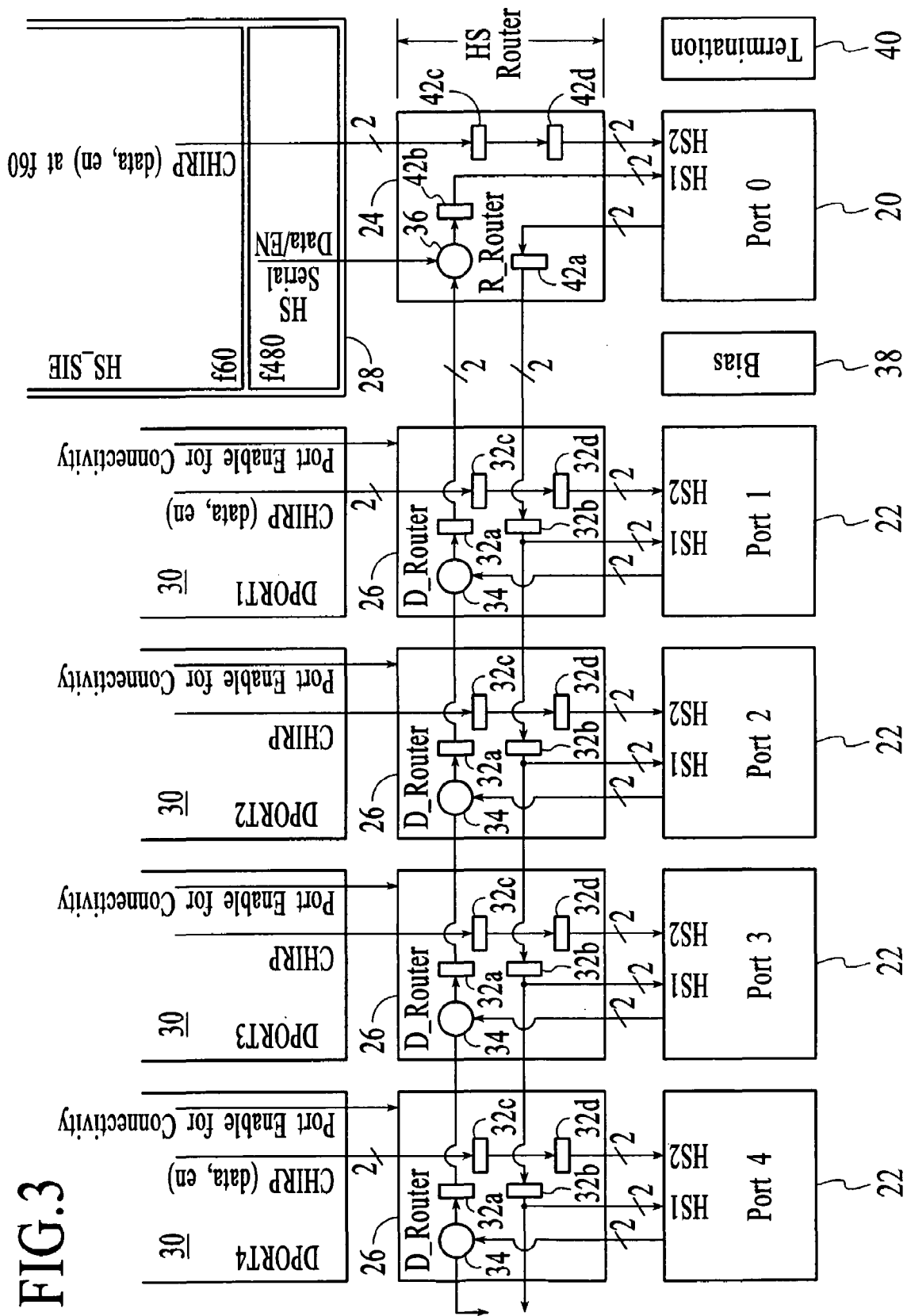
FIG. 3 illustrates a more detailed representation of the routers of FIG. 2.

FIG. 3 illustrates a more detailed diagram of the router portion shown in FIG. 2. The data port routers 26 each contain the same elements. Thus, within each data port router 26 are delay elements 32a, 32b, 32c, 32d (e.g., flip/flops) and a selection element 34 (e.g., a multiplexer). Two two-bit wires are input to each I/O port 22 from its corresponding router 26 and one two-bit wire is output from each I/O port 22 to its corresponding router 26. All of the connections to and from the root router 24 and at least one of the data port routers 26 carry signals at a frequency of 480 MHz. Further, each two-bit wire carries an enable signal and a data signal, such that every bit of a data stream has an enable bit. HS1 represents a high speed input for the data stream to the I/O port 22. HS2 represents a high speed input for auto-negotiation data (i.e., "CHIRP" data) from the data control block 30 to the I/O port 22.

During routing, data is sent serially one bit at a time downstream from the root port router 24 through the data port routers 26. Delay element 32a in each data port router 26 provides a one-bit delay as the data stream is transmitted from router to router downstream. Each data port control block 30 supplies a PORT ENABLE for CONNECTIVITY signal to each router 26 for its corresponding I/O port 22 in order to enable or disable the port 22 for receipt of the data stream. Regardless of whether the port 22 is enabled or disabled, the data stream is still transmitted through each router 26. In the upstream direction, data from one of the I/O ports 22 is routed through the selection element 34 and delay element 32b of each data port router 26 to the root port router 24. The root port router selection element 36 controls whether the upstream data is passed or a new high speed data stream is passed to the root port 20 to avoid data collision. Bias 38 and termination 40 represent circuit elements necessary to meet USB specifications, the details of which are well understood in the art. Delay elements 42a, 42b, 42c, and 42d are also included in the root port router 24.

Figure 4:
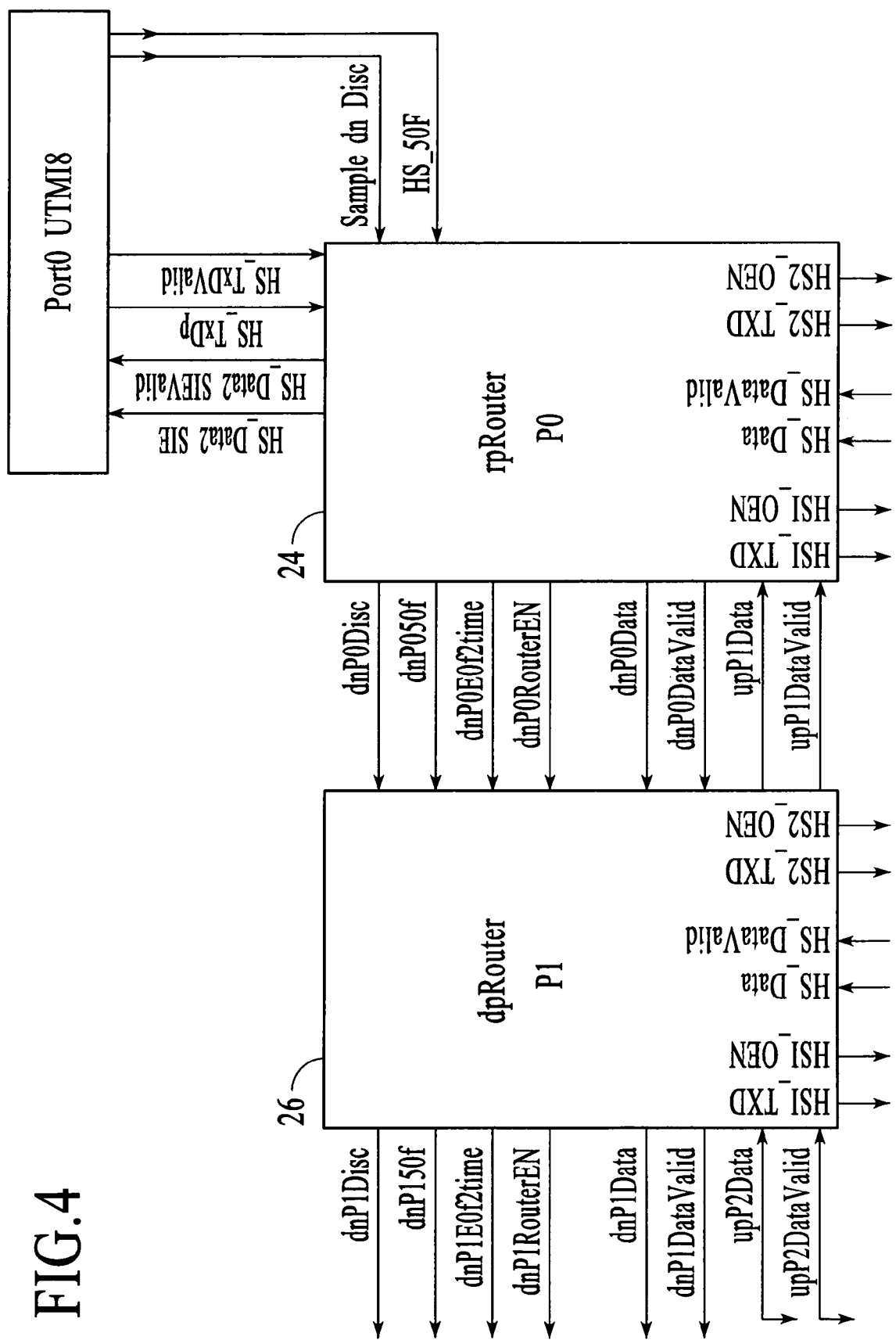
FIG. 4 illustrates signals transmitted within the router portion of FIG. 2.

FIG. 4 illustrates more particularly signal lines present between the root port router 24 and I/O port router 26 for Port1 in accordance with the serial data routing of the present invention. The names on the signal lines are meant as illustrative of the information transmitted on the signal lines, where "up" is port[i] to port[i−1], "dn" is port [i] to port[i+1], "tx" is for the outputs of the module, "SOF" is start of frame, RouterEN is router enable, and "Disc" is disconnect. The Disc signal checks for disconnect of a downstream device at a particular time in the USB frame. In the USB 2.0 specification, there are eight micro-frames within one millisecond period during the HS modes of operation. The signal Eof2Time refers to a particular time stamp inside the micro-frame. It is a defined USB frame time stamp to check for proper operation of down stream devices. As demonstrated by this figure, the data routing in accordance with the present invention utilizes a minimal number of signal lines in a straightforward and relatively uncomplicated manner.

Thus, the present invention achieves an effective routing solution for USB data transfers at high speed that avoids the complexity of layout, timing, clock skew, and physical implementation limitations of typical parallel routing solutions which rely on data conversions to lower speeds during routing. Further, the serial routing scheme offers consistency among the routers in a manner that provides greater flexibility for adjusting to the number of I/O ports being used.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for high speed USB data routing, the method comprising:

routing a data stream to and from USB I/O ports serially, wherein routing a data stream comprises routing on a multiple bit wire, the multiple bit wire carrying a data bit and a corresponding enable bit for each bit of the data stream;

maintaining a frequency of the data stream during the routing;

routing from a root port downstream to a least one I/O port and from one I/O port upstream to the root port; and providing a root port router for the root port and a data port router for each I/O port, wherein each data port router delays the data stream during the routing.

2. The method of claim 1 wherein routing a data stream further comprises routing on a two-bit wire, the two-bit wire carrying the data bit and the corresponding enable bit for each bit of the data stream.

3. The method of claim 1 further comprising performing the routing in a USB hub.

4. The method of claim 1 further comprising performing the routing with up to seven I/O ports.

5. The method of claim 1 wherein maintaining the frequency of the data stream during the routing further comprises maintaining the frequency at 480 MHz.

6. A system for high speed USB data routing, the system comprising:

a plurality of USB I/O ports;

a plurality of routers coupled to the plurality of USB I/O ports for routing a data stream to and from the USB I/O ports serially and maintaining a frequency of the data stream during the routing, wherein routing a data stream comprises routing on a multiple bit wire, the multiple bit wire carrying a data bit and a corresponding enable bit for each bit of the data stream; and a plurality of routers route from a root port downstream to at least one I/O port and from one I/O port upstream to the root port, wherein the plurality of routers further comprise a root port router for the root port and a data port router for each I/O port, wherein each data port router delays the data stream during the routing.

7. The system of claim 6 wherein the plurality of routers route on a two-bit wire, the two-bit wire carrying the data bit and the corresponding enable bit for each bit of the data stream.

8. The system of claim 6 wherein the plurality of I/O ports and the plurality of routers further comprise a router portion of a USB hub.

9. The system of claim 6 wherein the plurality of I/O ports further comprise up to seven I/O ports.

10. The system of claim 6 wherein the frequency of the data stream further comprises 480 MHz.

11. A method for high speed USB data routing, the method comprising:

provinding a root port router for a root port of a USB hub;

providing a data port router for each I/O port of the USB hub;

routing data of a data stream serially between the root port router and each data port router without altering a frequency of the data stream;

routing data downstream from the root port though the root port router and through each of the data port routers to at least one I/O port; and wherein routing data further comprises routing data upstream from one I/O port though each data port router and through the root port router to the root port, wherein each data port router and the root port router delays the data stream by one bit during the routing.

12. The method of claim 11 wherein the frequency of the data stream further comprises 480 MHz.

13. The method of claim 11 further comprising providing a data control block for the data port router and each I/O port to control enabling of each I/O port during the routing.

* * * * *